(12) United States Patent
Xie

(10) Patent No.: US 12,632,388 B2
(45) Date of Patent: May 19, 2026

(54) METHOD, APPARATUS, DEVICE, AND MEDIUM FOR CACHING A PROGRAM OBJECT

(71) Applicant: Lemon Inc., Grand Cayman (KY)

(72) Inventor: Zeqing Xie, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/770,314

(22) Filed: Jul. 11, 2024

(65) Prior Publication Data

US 2025/0021486 A1     Jan. 16, 2025

(30) Foreign Application Priority Data

Jul. 11, 2023 (CN) .......................... 202310847649.6

(51) Int. Cl.
| | |
|---|---|
| *G06F 12/08* | (2016.01) |
| *G06F 12/0873* | (2016.01) |
| *G06F 12/0893* | (2016.01) |

(52) U.S. Cl.
CPC ...... *G06F 12/0873* (2013.01); *G06F 12/0893* (2013.01)

(58) Field of Classification Search
CPC ............. G06F 12/0862; G06F 12/0873; G06F 12/0893; G06F 12/0877; G06F 9/4451; G06F 3/0656; G06F 3/0613; G06F 3/0653; G06F 3/0659; G06F 3/0679; G06F 2212/6028; G06F 2212/6022; G06F 2212/607; G06F 2212/7201
See application file for complete search history.

(56) References Cited

U.S. PATENT DOCUMENTS

| | | | | |
|---|---|---|---|---|
| 9,348,752 | B1 * | 5/2016 | Parakh ................ | G06F 11/1451 |
| 2002/0065899 | A1 * | 5/2002 | Smith .................... | H04L 67/563 |
| | | | | 709/227 |
| 2005/0066132 | A1 * | 3/2005 | Houki ................... | G06F 9/4812 |
| | | | | 711/137 |
| 2013/0054869 | A1 * | 2/2013 | Tolia ...................... | G06F 16/00 |
| | | | | 711/E12.007 |
| 2013/0305086 | A1 * | 11/2013 | Yulizar .................. | G11B 20/18 |
| | | | | 714/E11.056 |
| 2014/0013052 | A1 * | 1/2014 | Sawin ................. | G06F 12/0862 |
| | | | | 711/E12.024 |

FOREIGN PATENT DOCUMENTS

| | | |
|---|---|---|
| CN | 114153760 A | 3/2022 |

* cited by examiner

*Primary Examiner* — Tracy C Chan
(74) *Attorney, Agent, or Firm* — Alleman Hall LLP

(57) ABSTRACT

The disclosure provides a method, apparatus, device, and medium for caching a program object. The detailed description of this method includes: in response to a start of a target program, reading an information collection of a cache object from a storage device, preloading the cache object into a cache pool of the target program based on the information collection; and in response to a closure of the target program, saving the information collection of the cache object in the cache pool to the storage device. With this method, it is possible to eliminate the need to re-determine the preloaded object based on a manually maintained preloading policy each time the program starts, reduce computational consumption, and prevent the problem of degradation of program performance due to overloading or misloading of a cache object. In addition, the labor cost used to maintain the preload policy is reduced.

20 Claims, 4 Drawing Sheets

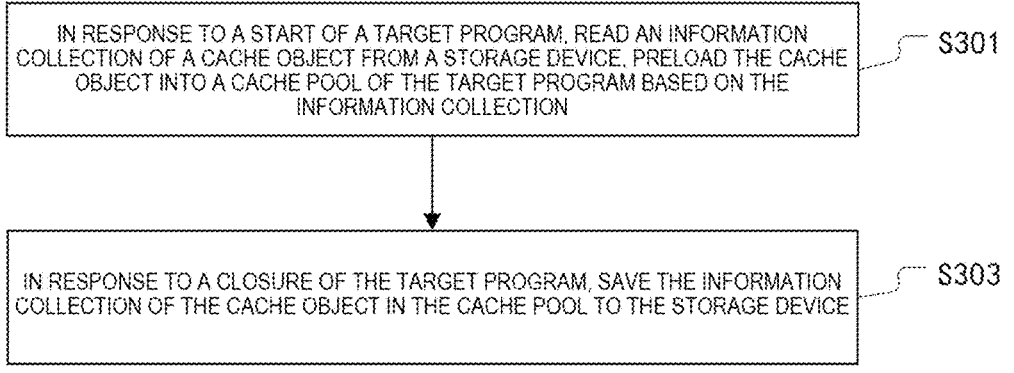

IN RESPONSE TO A START OF A TARGET PROGRAM, READ AN INFORMATION COLLECTION OF A CACHE OBJECT FROM A STORAGE DEVICE, PRELOAD THE CACHE OBJECT INTO A CACHE POOL OF THE TARGET PROGRAM BASED ON THE INFORMATION COLLECTION ⸻ S301

IN RESPONSE TO A CLOSURE OF THE TARGET PROGRAM, SAVE THE INFORMATION COLLECTION OF THE CACHE OBJECT IN THE CACHE POOL TO THE STORAGE DEVICE ⸻ S303

FIG. 3

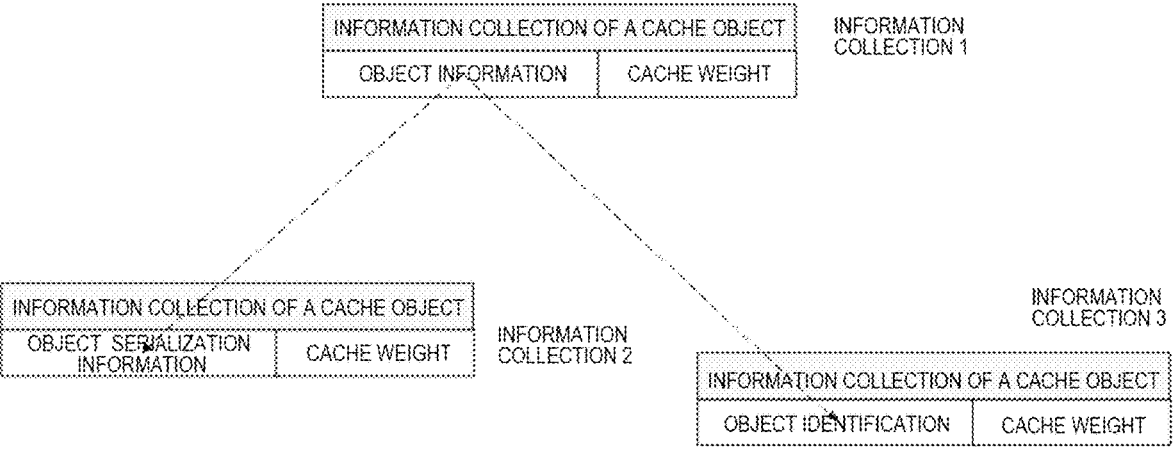

| INFORMATION COLLECTION OF A CACHE OBJECT | | INFORMATION COLLECTION 1 |
|---|---|---|
| OBJECT INFORMATION | CACHE WEIGHT | |

| INFORMATION COLLECTION OF A CACHE OBJECT | | INFORMATION COLLECTION 2 |
|---|---|---|
| OBJECT SERIALIZATION INFORMATION | CACHE WEIGHT | |

INFORMATION COLLECTION 3

| INFORMATION COLLECTION OF A CACHE OBJECT | |
|---|---|
| OBJECT IDENTIFICATION | CACHE WEIGHT |

FIG. 4

METHOD, APPARATUS, DEVICE, AND MEDIUM FOR CACHING A PROGRAM OBJECT

CROSS-REFERENCE TO RELATED APPLICATION

This application claims priority to Chinese patent application No. 202310847649.6, filed on Jul. 11, 2023 and entitled "A METHOD, APPARATUS, DEVICE, AND MEDIUM FOR CACHING A PROGRAM OBJECT", which is incorporated herein by reference in its entirety.

FIELD

The present disclosure relates to the field of data caching technology, particularly to a method, apparatus, device, and medium for caching a program object.

BACKGROUND

Software programs, especially complex software programs, often invoke a large number of program objects during runtime, and the process consumes a large amount of time resources. Currently, in order to reduce the time consumption of invoking objects, preloading scheme and cache pool scheme for a program object can be used to reduce the time consumption of the program object when it is invoked for the first time and when it is not invoked for the first time. However, in some scenarios, the use of a cache pool technology and preloading technology still has the following problems: on the one hand, in complex business scenarios, the program is prone to the problem of excessive preloading or erroneous preloading into the cache, which leads to performance degradation. On the other hand, with the change of business content, it needs to consume a lot of manpower for the maintenance of preload policy.

SUMMARY

The present disclosure describes a method, apparatus, device, and medium for caching a program object.

According to a first aspect, a method of caching a program object is provided, comprising:

in response to a start of a target program, reading an information collection of a cache object from a storage device, preloading the cache object into a cache pool of the target program based on the information collection; and in response to a closure of the target program, saving the information collection of the cache object in the cache pool to the storage device.

According to a second aspect, an apparatus for caching a program object, comprising:

a program starting unit configured to read an information collection of a cache object from a storage device, preload the cache object into a cache pool of the target program based on the information collection; and a program closing unit configured to, in response to a closure of the target program, save the information collection of the cache object in the cache pool to the storage device.

According to a third aspect, a computer-readable storage medium having a computer program stored thereon is provided, the computer program, when executed in a computer, causing the computer to execute the method of the first aspect.

According to a fourth aspect, an electronic device comprising a memory and a processor is provided, the memory storing an executable code, which, when executed by the processor, implements the method of the first aspect.

A method, apparatus, device, and medium for caching a program object are provided according to embodiments of the present disclosure. Firstly, in response to a start of a target program, an information collection of a cache object is read from a storage device, preloading the cache object into a cache pool of the target program based on the information collection. Then, in response to a closure of the target program, the information collection of the cache object is saved in the cache pool to the storage device. With any of the above-described methods, apparatuses, storage media, and electronic devices, it is possible to eliminate the need to re-determine preloaded objects based on a manually maintained preloading policy each time a program is started, reducing computational consumption and preventing problems of degradation of the performance of the program due to over-loading or mis-loading of cache objects. In addition, the labor cost used to maintain the preload policy is reduced.

BRIEF DESCRIPTION OF THE DRAWINGS

FIG. 3 shows a schematic flowchart of a method of caching a program object according to embodiments of the present disclosure;

FIG. 4 shows a schematic diagram of an information collection of a cache object according to embodiments of the present disclosure;

DETAILED DESCRIPTION

Figure 1:
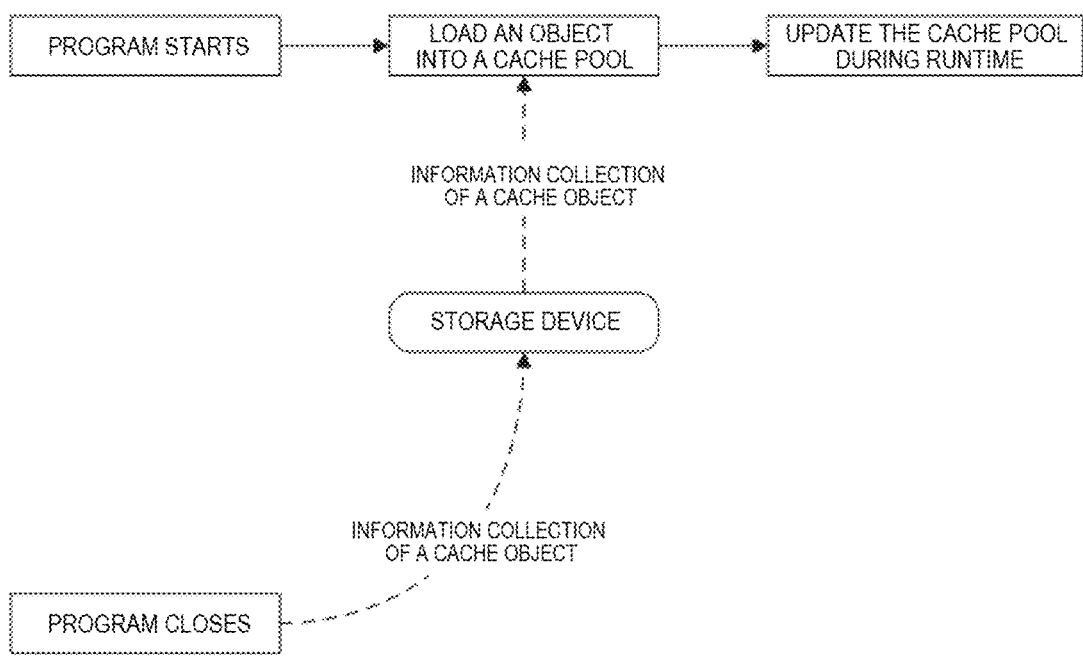
FIG. 1 shows a schematic diagram of a method of caching a program object according to embodiments of the present disclosure.

The technical solutions provided herein are described in further detail below in connection with the accompanying drawings and embodiments. It is to be understood that the specific embodiments described herein are only for explaining the invention in question and are not a limitation of the invention. It is also to be noted that, for ease of description, only the portions related to the relevant invention are shown in the accompanying drawings. It is to be noted that the embodiments and features in the embodiments of the present disclosure may be combined with each other without conflict.

In the description of the embodiments of the present disclosure, the term "comprising" and its analogues should be understood as open-ended inclusion, i.e., "comprising but not limited to". The term "based on" is to be understood as "at least partially based on". The terms "a/an implementation" or "the implementation" are to be understood as "at least one/an implementation". The term "some implementations" should be understood as "at least some implementations". Other definitions, both explicit and implicit, may be comprised below.

As mentioned earlier, software programs, especially complex software programs, often invoke a large number of program objects (Objects, or simply objects) during operation, consuming a large amount of time resources. In order to reduce the time consumption of the invoked objects, preloading schemes and cache pool schemes for the program objects are often used at present to reduce the time consumption of the program objects when they are invoked for the first time and when they are not invoked for the first time. Specifically, for example, a cache pool scheme may include: saving objects created for the first time in program operation to a cache pool (Cache Pool), so that when the cached program object is invoked again, the object cached in the cache pool can be invoked directly, reducing the time consumption of creating the object again, thereby improving the performance of program operation. Using only the cache pool scheme can only reduce the time spent on a non-first-time invocation of an object, but it cannot reduce the time spent on a first-time invocation of an object. In order to reduce the time consumption when the object is invoked for the first time, a preloading scheme comprises: preloading the program object when the program is started, so that when the program object is actually invoked, the preloaded program object can be directly invoked, reducing the time consumption when the program object is invoked for the first time.

However, the existing preloading scheme and cache pool scheme still have the following problems: on the one hand, since each program start needs to determine the preloaded object based on the preloading policy, and usually the program start can be used for preloading limited time resources, if too many objects are preloaded, or seldom-used objects are loaded into the cache pool, it can lead to a decline in the performance of the program or a waste of cache resources. On the other hand, based on existing preloading schemes, it is often necessary to set and maintain a preloading policy for determining which objects can be preloaded by human beings, and the engineers who set and maintain the preloaded objects often need to obtain, for example, iterative information on the business state or information on the user's habits from different business teams in order to determine how to set and update the preloading policy. In complex business scenarios with rapid iterations, these tasks consume a lot of labor costs.

Figure 2:
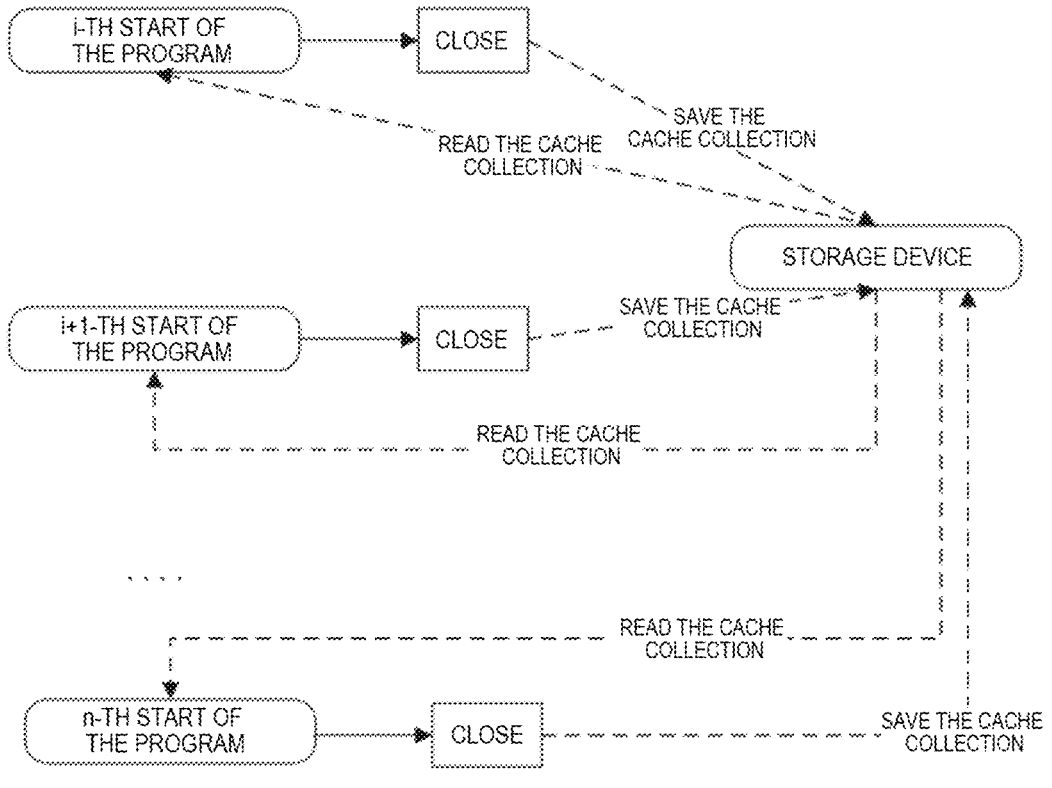
FIG. 2 shows a schematic diagram of a cross-program lifecycle storage object according to embodiments of the present disclosure.

In order to solve the above technical problems, embodiments of the present disclosure provide a method of caching a program object. FIG. 1 shows a schematic diagram of a method of caching a program object according to embodiments of the present disclosure. As shown in FIG. 1, in response to a start of a target program, an information collection of a cache object is read from a storage device, and the cache object is preloaded into a cache pool of the target program based on the information collection. Moreover, in response to a closure of the target program, the information collection of the cache object is saved in the cache pool to the storage device. The method has the following advantages: on the one hand, it is possible to make the cache object automatically reusable in different life cycles of the target program by saving an information collection of the cache object of the target program to a storage device and reloading the cache object by reading the information collection of the cache object from the storage device, i.e., when the target program is started several times, one of the starts can substantially reuse the cache object of the program before the closure of the program. This eliminates the need to re-determine which objects to preload each time the program starts based on a manually maintained preload policy and reduces computational consumption. FIG. 2 shows a schematic diagram of a cross-program lifecycle storage object according to embodiments of the present disclosure. As shown in FIG. 2, for example, at the i-th start of a program over a plurality of starts, the cache objects from the closure of the previous program (n−1st) can be reused directly by reading a collection of information about the cache objects (or simply the cache collection) from the storage device. In turn, when the program is closed after that start, the current cache object can be transformed into the corresponding information collection and saved to the storage device for reuse at the next (e.g., n+1st) program start. In the second aspect, the cache objects are automatically reused in different life cycles of the target program, which essentially determines the next cache loading object based on the actual running condition of the program on the previous occasion, with high accuracy, and prevents the problem of overloading the cache objects, or loading the wrong cache objects (invalid cache objects), which leads to the problem of degradation of the performance of the program. In the third aspect, with this method, the dependence of the preload policy on manual maintenance is greatly reduced, and the human cost used to maintain the preload policy is reduced. The detailed process of the method is described further below.

FIG. 3 shows a schematic flowchart of a method of caching a program object according to embodiments of the present disclosure. As shown in FIG. 3, the method comprises at least the following steps.

At Step S301, in response to a start of a target program, an information collection of a cache object is read from a storage device, and the cache object is preload into a cache pool of the target program based on the information collection;

At Step S303, in response to a closure of the target program, the information collection of the cache object is saved in the cache pool to the storage device.

Firstly, at step S301, in response to a start of a target program, an information collection of a cache object is read from a storage device, and the cache object is preload into a cache pool of the target program based on the information collection. At this step, an information collection of a cache object may be read from the storage device at the start of the target program, and the cache object may be preloaded into a cache pool of the target program based on the information collection. In different embodiments, the target program may be a different software (Software) product or application, or a program for a different specific purpose or business, which is not limited by this specification. In different embodiments, the storage device may also be a different specific type of storage device. In one embodiment, the storage device may be a persistent storage device, such as a disk or flash memory. In different embodiments, the specific way of reading the information collection of the cache object from the storage device may also be different. In one embodiment, for example, the information collection of a cache object may be read from a storage file saved in the storage device. In another embodiment, the information collection of a cache object may also be read from the storage device, for example, in the form of accessing a database.

FIG. 4 shows a schematic diagram of an information collection of a cache object according to embodiments of the present disclosure. As shown in FIG. 4, in an embodiment, the information collection of the cache object comprises object information and a cache weight of the cache object (information collection 1). Wherein the cache weight may be used to indicate the importance of the cache object. In different embodiments, the cache weight may be determined based on different weight parameters, specifically, the weight parameters may comprise, for example, one or more of the number of invocations of the cache object, an order of invocations, and a consumption of construction resources. When the program is running after the start, the weight parameter of the cache object may be updated as it is invoked. Thus, in one embodiment, during running after the start of the target program, the cache weight of the cache objects can be updated based on invocation of the cache object in the cache pool; and based on the cache weight of the cache object, it can be determined whether or not to retain or move the cache object out of the cache pool. In the above manner, it is possible to retain a cache object of high importance in the cache pool when the program is running, improve the cache hit rate, and improve the performance of program running.

In different embodiments, the object information of the cache object may be different. In one embodiment, the object information may comprise serialization information of the cache object, as shown in the information collection 2 in FIG. 4. Further, the serialization information of the cache object may be read from the storage device, and the cache object may be preloaded into a cache pool of the target program by deserializing the serialization information. Serialization is the conversion of state information of an object into a form that can be stored or transmitted, i.e. into serialization information of the object. By serializing the cache object, the current state of the cache object can be easily written to the persistent storage device. It is also possible to read the serialization information from the persistent storage device and deserialize it to re-obtain the cache object that maintains the state before serialization.

In some scenarios, the cache object may also be preloaded into the cache pool by other object information if it is for a particular object that is more difficult to serialize. For example, in some embodiments, objects for caching may be obtained from the operating system via object identification, e.g. an image may be obtained from the operating system via an identification (Identity, ID) of the image, which is typically harder to serialize. Therefore, in one embodiment, the object information may also comprise an identification of the cache object, as shown in the information collection 3 in FIG. 4. Further, the identification of the cache object can be read from the storage device, the cache object can be obtained from the operating system via the identification, and the cache object can be preloaded into the cache pool of the target program.

Figure 5:
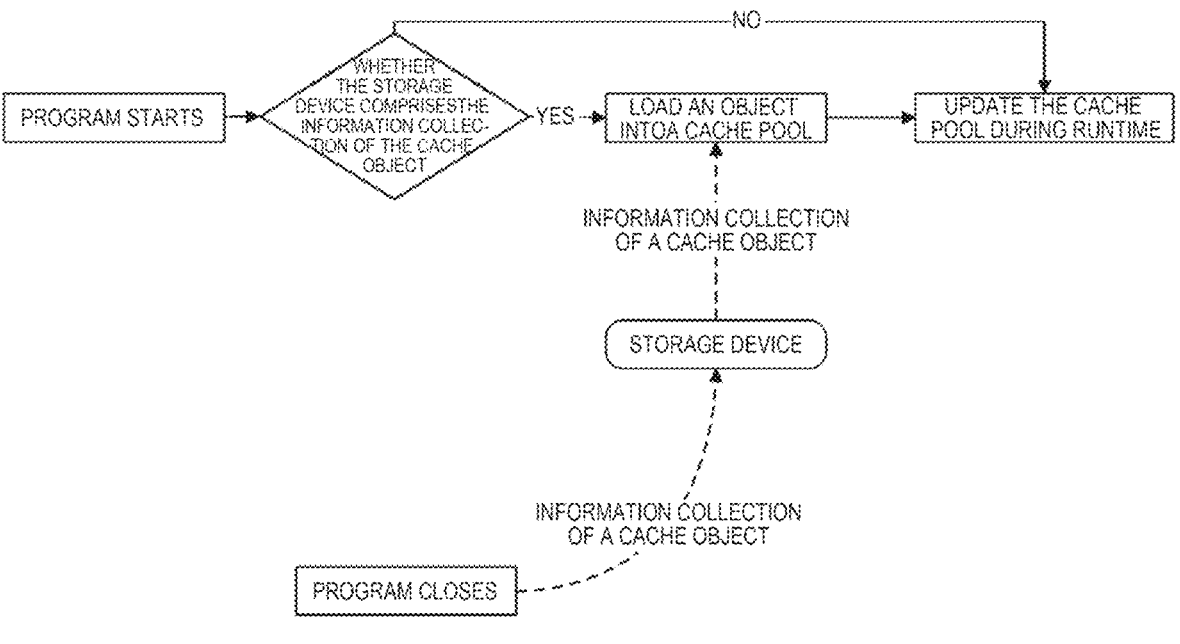
FIG. 5 shows a schematic diagram of a method of caching a program object according to another embodiment of the present disclosure.

In some scenarios, such as when a target program is started for the first time, the binding information of the cache object is not necessarily present in the storage device. In order to build a cache pool to load cache objects into it in such cases, FIG. 5 shows a schematic diagram of a method of caching a program object according to another embodiment of the present disclosure. As shown in FIG. 5, therefore, in one embodiment shown in FIG. 5, after the program is started, it is also possible to determine whether the storage device comprises the information collection of the cache object, reading the information collection of the cache object from the storage device in response to a determination that the storage device comprise the information collection of the cache object. In response to a determination that the storage device does not comprise the information collection, the cache object is determined from the program object and place it into the cache pool based on invocation information to the program object during the execution of the program. In the above manner, it is possible to initially establish a cache pool and load cache objects therein during program operation after the target program is started for the first time.

Then, at step S303, in response to a closure of the target program, the information collection of the cache object is saved in the cache pool to the storage device. At this step, an information collection of the cache object in the cache pool may be saved to the storage device at the closure of the target program. In embodiments where the object information comprises serialization information of the cache object as described above, the cache object of the cache pool may be serialized, obtaining the serialization information, saving the serialization information to the storage device. In an embodiment where the object information comprises an identification of the cache object as described above, an identification of the cache object, can be saved to the storage device.

In order to prevent, for example, an unexpected exit of the program, which would result in the information collection of the cached object not being properly updated to the storage device. In an embodiment, also in response to a predetermined event, the information collection of the cache objects in the cache pool, is saved to the storage device. In different specific embodiments, the predetermined event may be different. In a specific embodiment, the predetermined event may comprise the target program returning to a background or reaching a predetermined time node. In the above manner, the loss of the information collection of the cache object can be prevented or reduced, for example, due to an unexpected exit of the program.

Figure 6:
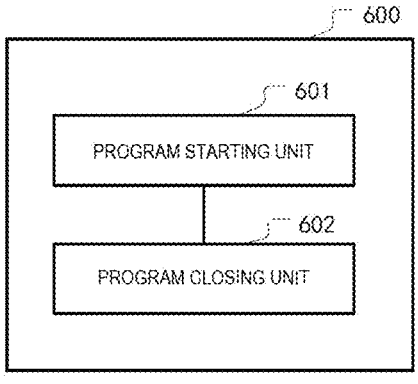
FIG. 6 shows a schematic block diagram of an apparatus for caching a program object according to an embodiment of the present disclosure.

Another portion of embodiments of the present disclosure also provides an apparatus for caching a program object. FIG. 6 shows a schematic block diagram of an apparatus for caching a program object according to embodiments of the present disclosure. The apparatus is used to execute the method shown in FIG. 3, as shown in FIG. 6, and the apparatus 600 comprises:

a program starting unit 601 configured to read an information collection of a cache object from a storage device, preload the cache object into a cache pool of the target program based on the information collection; and a program closing unit 602 configured to, in response to a closure of the target program, save the information collection of the cache object in the cache pool to the storage device.

The present disclosure also provides an electronic device comprising a memory and a processor, the memory storing an executable code, which, when executed by the processor, implements the method shown in FIG. 3.

Figure 7:
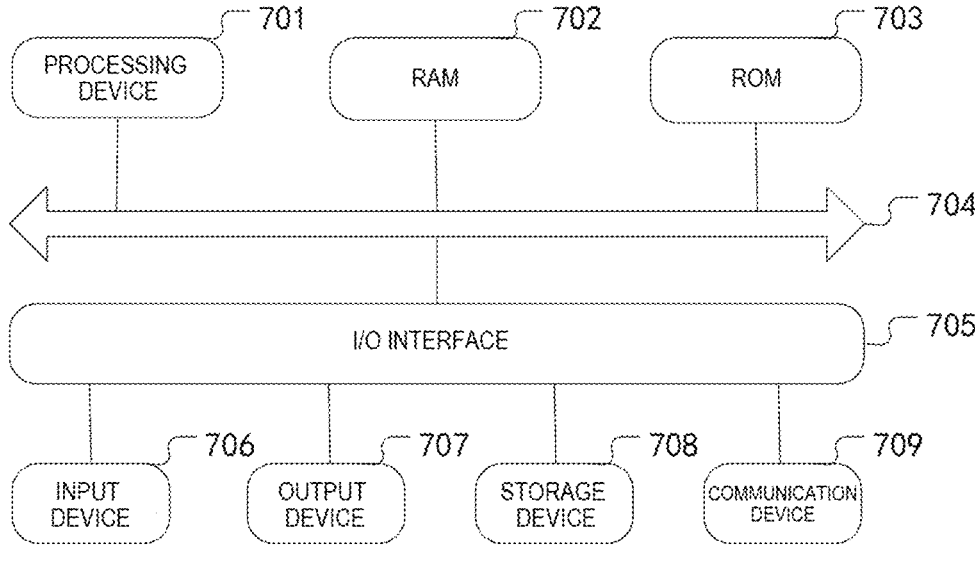
FIG. 7 shows a structural schematic diagram of an electronic device suitable for implementing an embodiment of the present disclosure.

The following can also refer to FIG. 7, which shows a structural schematic diagram of an electronic device suitable for implementing an embodiment of the present disclosure. The electronic device 700 shown in FIG. 7 is only an example and should not impose any limitations on the functionality and scope of use of the embodiments of this application.

As shown in FIG. 7, the electronic device 700 may comprise a processing device (e.g., a central processing unit, a graphics processor, etc.) 701. The above-described processing device 701 may be a general purpose processor, a Digital Signal Processing (DSP), a microprocessor, or a microcontroller, and may further comprise an Application Specific Integrated Circuit (ASIC), a Field-Programmable Gate Array (FPGA), or other programmable logic device, discrete gate or transistor logic device, discrete hardware component, which may be based upon a read-only memory (ROM) 702 or loaded from storage device 708 into random access memory (RAM) 703 and perform various appropriate actions and processing. Also stored in the RAM 703 are various programs and data necessary for the operation of the electronic device 700. The processing device 701, the ROM 702, and the RAM 703 are connected to each other via a bus 704. An input/output (I/O) interface 705 is also connected to the bus 704.

Typically, the following devices may be connected to the I/O interface 705: an input device 706 comprising, for example, a touch screen, a touch pad, a keyboard, a mouse, and the like; an output device 707 comprising, for example, a liquid crystal display (LCD), a speaker, a vibrator, and the like; a storage device 708 comprising, for example, a magnetic tape, a hard drive, and the like; and a communication device 709. The communication device 709 may allow the electronic device 700 to communicate wirelessly or wiredly with other devices to exchange data. While FIG. 7 shows electronic device 700 with various devices, it should be understood that it is not required to implement or have all of the devices shown. More or fewer devices may alternatively be implemented or possessed. Each block shown in FIG. 7 may represent a single device or may represent a plurality of devices as desired.

In particular, according to embodiments of the present application, the process described above with reference to the flowchart may be implemented as a computer software program. For example, embodiments of the present application include a computer program product comprising a computer program carried on a computer readable medium, the computer program comprising program code for performing the method shown in the flowchart. In such embodiments, the computer program may be downloaded and installed from a network via the communication device 709, or from the storage device 708, or from the ROM 702. When this computer program is executed by the processing device 701, the above-described functions defined in the method of caching a program object provided in the embodiments of the present application are performed.

Figure 8:
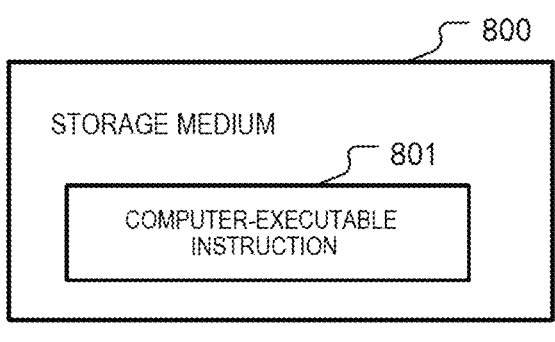
FIG. 8 shows a structural schematic diagram of a storage medium suitable for implementing embodiments of the present disclosure.

This disclosure also provides a computer-readable storage medium having a computer program stored thereon, the computer program, when executed in a computer, causing the computer to execute the method of caching a program object as shown in FIG. 1 provided by embodiments of the present disclosure. FIG. 10 is a schematic diagram of a storage medium for implementing the embodiments of the present application. For example, as shown in FIG. 8, the storage medium 800 may be a non-temporary computer-readable storage medium for storing the non-transitory computer-executable instructions 801. The method of caching a program object provided in the embodiments of the present application may be implemented when the non-transitory computer-executable instructions 801 are executed by the processor, for example, one or more steps in the method of caching a program object provided according to the embodiments of the present application may be performed when the non-transitory computer-executable instructions 801 are executed by the processor. The storage medium 800 may be applied in the electronic device described above, for example, the storage medium 800 may comprise a memory in the electronic device. The description of the storage medium 800 can be referred to the description of the memory in the embodiment of the electronic device, and the repetition will not be repeated. The specific functions and technical effects of the storage medium 800 can be referred to the description of the method of caching a program object provided in the embodiments of the present application and will not be repeated herein.

It should be noted that the computer-readable medium described in the embodiments disclosed herein can be a computer-readable signal medium, a computer-readable storage medium, or any combination of the above two. A computer-readable storage medium may be, but is not limited to, an electrical, magnetic, optical, electromagnetic, infrared, or semiconductor system, device, or device, or any combination thereof. More specific examples of computer-readable storage media may include, but are not limited to: electrical connections with one or more wires, storage cards for smartphones, storage components for tablets, portable computer disks, hard drives for personal computers, random access memory (RAM), read-only memory (ROM), erasable programmable read-only memory (EPROM or flash), fiber optics, portable compact disk read-only memory (CD-ROM), optical storage devices, magnetic storage devices, or any suitable combination of the above. In the embodiments disclosed herein, a computer-readable storage medium may be any tangible medium containing or storing a program, which may be used by an instruction execution system, device, or device, or in combination with it. In the embodiments disclosed herein, computer-readable signal media may include data signals propagated in the baseband or as part of the carrier wave, which carry computer-readable program code. This type of transmitted data signal can take various forms, including but not limited to electromagnetic signals, optical signals, or any suitable combination of the above. A computer-readable signal medium can also be any computer-readable medium other than a computer-readable storage medium, which can send, propagate, or transmit programs for use by instruction execution systems, devices, or devices, or in combination with them. The program code contained on computer-readable media can be transmitted using any appropriate medium, including but not limited to: wires, optical cables, RF (Radio Frequency), etc., or any suitable combination of the above.

The above-mentioned computer-readable medium may be included in the electronic device mentioned above; It can also exist separately without being assembled into the electronic device. The above-mentioned computer-readable medium carries one or more programs, which, when executed by the server, enable the electronic device to implement the method of caching a program object provided in the embodiments of the present application.

Computer program code for executing the operations of the embodiments of the present disclosure can be written in one or more programming languages or combinations thereof, including object-oriented programming languages such as Java, Smalltalk, C++, and conventional procedural programming languages such as C or similar programming languages. Program code can be completely executed on the user's computer, partially executed on the user's computer, executed as an independent software package, partially executed on the user's computer, partially executed on a remote computer, or completely executed on a remote computer or server. In cases involving remote computers, remote computers can connect to user computers through any type of network, including local area networks (LANs) or wide area networks (WANs), or can connect to external computers (such as using internet service providers to connect via the internet).

The flowchart and block diagram in the attached FIG. illustrate the possible architecture, functions, and operations of the systems, methods, and computer program products implemented in accordance with various embodiments disclosed herein. At this point, each box in a flowchart or block diagram can represent a module, program segment, or part of code that contains one or more executable instructions for implementing a specified logical function. It should also be noted that in some alternative implementations, the functions indicated in the box can also occur in a different order than those indicated in the accompanying drawings. For example, two consecutive boxes can actually be executed in basic parallel, and sometimes they can also be executed in opposite order, depending on the functionality involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions. The units described in this embodiment of the present disclosure can be implemented through software or hardware. Among them, the name of the unit does not constitute a limitation on the unit itself in a certain situation. The functions described above in this article can be at least partially executed by one or more hardware logic components. For example, nonrestrictive demonstration types of hardware logic components that can be used include: Field Programmable Gate Arrays (FPGAs), Application Specific Integrated Circuits (ASICs), Application Specific Standard Products (ASSPs), Systems on Chip (SOC), Complex Programmable Logic Devices (CPLDs), and so on.

The various components in this manual are described in a progressive manner, and the same and similar parts between each component can be referred to each other. Each component emphasizes the differences from other components. Especially for storage media and computing device embodiments, due to their basic similarity to method embodiments, the description is relatively simple. Please refer to the section on method embodiments for relevant information.

The above description is only for the better embodiments disclosed in this disclosure and an explanation of the technical principles used. Technicians in this field should understand that the scope of disclosure referred to in this disclosure is not limited to technical solutions formed by specific combinations of the aforementioned technical features and should also cover other technical solutions formed by arbitrary combinations of the aforementioned technical features or their equivalent features without departing from the disclosed concept. For example, a technical solution formed by replacing the above features with (but not limited to) technical features with similar functions disclosed in this disclosure. Furthermore, although the operations are depicted in a specific order, this should not be understood as requiring them to be executed in the specific order shown or in sequential order. In certain environments, multitasking and parallel processing may be advantageous. Similarly, although several specific implementation details are included in the above discussion, these should not be interpreted as limitations on the scope of this disclosure. Some features described in the context of individual embodiments can also be combined and implemented in a single embodiment. On the contrary, various features described in the context of a single embodiment can also be implemented individually or in any suitable sub combination in multiple embodiments.

The specific embodiments described above provide further details of the objects, technical solutions and beneficial effects of embodiments of the present invention. Although the present subject matter has been described using language specific to structural features and/or method logic actions, it should be understood that the subject matter limited in the appended claims is not necessarily limited to the specific features or actions described above. Rather, the particular features and actions described above are merely exemplary forms of implementing the claims. It should be understood that the above description is only a specific implementation of the embodiments of the present invention and is not intended to limit the scope of protection of the present invention, and any modifications, equivalent substitutions, improvements, and the like made on the basis of the technical solutions of the present invention shall be included in the scope of protection of the present invention.

The invention claimed is:

1. A method of caching a program object, comprising:
   in response to a start of a target program, reading an information collection of a cache object of the target program from a storage device, preloading the cache object into a cache pool of the target program based on the information collection; and
   in response to a closure of the target program, saving the information collection of the cache object in the cache pool to the storage device.

2. The method of claim 1, wherein the information collection of the cache object comprises object information and a cache weight of the cache object, the cache weight being configured to indicate an importance of the cache object.

3. The method of claim 2, wherein
   the object information comprises serialization information of the cache object, the serialization information being state information of the cache object in a form that can be stored or transmitted;
   the reading an information collection of a cache object from a storage device, preloading the cache object into a cache pool of the target program based on the information collection comprises:
      reading the serialization information of the cache object from the storage device, preloading the cache object into the cache pool of the target program by deserializing the serialization information to obtain the cache object with the state information before being serialized; and
   the saving the information collection of the cache object in the cache pool to the storage device comprises:
      obtaining the serialization information by serializing the cache object in the cache pool, saving the serialization information to the storage device.

4. The method of claim 2, wherein
   the object information comprises an identification of the cache object;
   the reading an information collection of a cache object from a storage device, preloading the cache object into a cache pool of the target program based on the information collection comprises:
      reading the identification of the cache object from the storage device, obtaining the cache object from a specific operating system by the identification, preloading the cache object into the cache pool of the target program; and
   the saving the information collection of the cache object in the cache pool to the storage device comprises saving the identification of the cache object to the storage device.

5. The method of claim 2, wherein the cache weight is determined based on one or more of the number of invocations of the cache object, an order of invocations, and a consumption of construction resources.

6. The method of claim 2, further comprising:

updating, during an execution of the target program, the cache weight of the cache object based on an invocation of the cache object in the cache pool; and determining, based on the cache weight of the cache object, whether to retain or remove the cache object from the cache pool.

7. The method of claim 1, further comprising:

in response to a predetermined event, saving the information collection of cache object in the cache pool to the storage device.

8. The method of claim 7, wherein the predetermined event comprises the target program returning to a background or reaching a predetermined time node.

9. The method of claim 1, wherein the reading an information collection of a cache object from a storage device comprises:

determining whether the storage device comprises the information collection of the cache object, reading the information collection of the cache object from the storage device in response to a determination that the storage device comprise the information collection of the cache object; and the method further comprises:

in response to a determination that the storage device does not comprise the information collection, determining, based on information about the program object invoked during an execution of the target program, the cache object from the program object and placing the cache object into the cache pool.

10. An electronic device comprising a memory and a processor, the memory storing an executable code, which, when executed by the processor, implements the acts comprising:

in response to a start of a target program, reading an information collection of a cache object of the target program from a storage device, preloading the cache object into a cache pool of the target program based on the information collection; and in response to a closure of the target program, saving the information collection of the cache object in the cache pool to the storage device.

11. The device of claim 10, wherein the information collection of the cache object comprises object information and a cache weight of the cache object, the cache weight being configured to indicate an importance of the cache object.

12. The device of claim 11, wherein the object information comprises serialization information of the cache object, the serialization information is state information of the cache object in a form that can be stored or transmitted;

the reading an information collection of a cache object from a storage device, preloading the cache object into a cache pool of the target program based on the information collection comprises:

reading the serialization information of the cache object from the storage device, preloading the cache object into the cache pool of the target program by deserializing the serialization information to obtain the cache object with the state information before being serialized; and the saving the information collection of the cache object in the cache pool to the storage device comprises:

obtaining the serialization information by serializing the cache object in the cache pool, saving the serialization information to the storage device.

13. The device of claim 11, wherein the object information comprises an identification of the cache object;

the reading an information collection of a cache object from a storage device, preloading the cache object into a cache pool of the target program based on the information collection comprises:

reading the identification of the cache object from the storage device, obtaining the cache object from a specific operating system by the identification, preloading the cache object into the cache pool of the target program; and the saving the information collection of the cache object in the cache pool to the storage device comprises saving the identification of the cache object to the storage device.

14. The device of claim 11, wherein the cache weight is determined based on one or more of the number of invocations of the cache object, an order of invocations, and a consumption of construction resources.

15. The device of claim 11, wherein the acts further comprise:

updating, during an execution of the target program, the cache weight of the cache object based on an invocation of the cache object in the cache pool; and determining, based on the cache weight of the cache object, whether to retain or remove the cache object from the cache pool.

16. The device of claim 10, wherein the acts further comprise:

in response to a predetermined event, saving the information collection of cache object in the cache pool to the storage device.

17. The device of claim 16, wherein the predetermined event comprises the target program returning to a background or reaching a predetermined time node.

18. The device of claim 10, wherein the reading an information collection of a cache object from a storage device comprises:

determining whether the storage device comprises the information collection of the cache object, reading the information collection of the cache object from the storage device in response to a determination that the storage device comprise the information collection of the cache object; and the acts further comprise:

in response to a determination that the storage device does not comprise the information collection, determining, based on information about the program object invoked during an execution of the target program, the cache object from the program object and placing the cache object into the cache pool.

19. A non-transitory computer-readable storage medium having a computer program stored thereon, the computer program, when executed in a computer, implementing the acts comprising:

in response to a start of a target program, reading an information collection of a cache object of the target program from a storage device, preloading the cache object into a cache pool of the target program based on the information collection; and in response to a closure of the target program, saving the information collection of the cache object in the cache pool to the storage device.

20. The medium of claim 19, wherein the information collection of the cache object comprises object information and a cache weight of the cache object, the cache weight being configured to indicate an importance of the cache object.

\* \* \* \* \*